(12) United States Patent
Tezuka et al.

(10) Patent No.: US 10,399,194 B2
(45) Date of Patent: Sep. 3, 2019

(54) ROTARY TABLE ASSEMBLY WITH COVER

(71) Applicant: FANUC Corporation, Yamanashi (JP)

(72) Inventors: Hiroki Tezuka, Yamanashi (JP); Tomoya Itou, Yamanashi (JP); Zheng Tong, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 357 days.

(21) Appl. No.: 14/741,581

(22) Filed: Jun. 17, 2015

(65) Prior Publication Data

US 2015/0367470 A1    Dec. 24, 2015

(30) Foreign Application Priority Data

Jun. 18, 2014   (JP) ................................ 2014-125783

(51) Int. Cl.
  *B23Q 5/04*    (2006.01)
  *B23Q 11/08*   (2006.01)
  *B23Q 1/52*    (2006.01)
  *B23Q 5/10*    (2006.01)

(52) U.S. Cl.
  CPC .............. *B23Q 1/522* (2013.01); *B23Q 5/10* (2013.01); *B23Q 11/0883* (2013.01)

(58) Field of Classification Search
  CPC ........ B23Q 1/52; B23Q 11/08; B23Q 11/0883
  See application file for complete search history.

(56) References Cited

U.S. PATENT DOCUMENTS

| | | | | |
|---|---|---|---|---|
| 2,008,774 A | * | 7/1935 | Spalding ................... | E21B 3/04 173/165 |
| 2,172,777 A | * | 9/1939 | Spalding ................... | E21B 3/04 175/195 |
| 2,205,269 A | * | 6/1940 | Morgan, Jr. .............. | E21B 3/04 188/69 |
| 2,254,183 A | * | 8/1941 | Maier ....................... | E21B 3/04 74/417 |
| 2,600,555 A | * | 6/1952 | Maier ....................... | E21B 3/04 175/40 |
| 2,853,274 A | * | 9/1958 | Collins ..................... | E21B 3/04 173/165 |
| 4,117,750 A | * | 10/1978 | Kopelev ............ | B23Q 11/0883 384/480 |

(Continued)

FOREIGN PATENT DOCUMENTS

| | | |
|---|---|---|
| JP | 4-90770 U | 8/1992 |
| JP | 6-75633 U | 10/1994 |

(Continued)

OTHER PUBLICATIONS

Decision to Dismiss the Amendment in JP Application No: 2014-125783, dated Dec. 15, 2015.

(Continued)

*Primary Examiner* — Tyrone V Hall, Jr.
(74) *Attorney, Agent, or Firm* — Hauptman Ham, LLP

(57) ABSTRACT

A rotary table assembly is provided with a rotary table with a workpiece mounting table on one end of a rotating shaft and a cover covering the rotary table. A seal member is disposed between the cover and the workpiece mounting table, thereby preventing foreign matter, such as chips, from adhering to the rotary table.

7 Claims, 6 Drawing Sheets

(56) References Cited

U.S. PATENT DOCUMENTS

| | | | | |
|---|---|---|---|---|
| 4,565,378 | A * | 1/1986 | Wehrfritz | F16J 15/008 277/304 |
| 6,239,408 | B1 * | 5/2001 | Takahashi | B23K 9/323 219/125.11 |
| 6,412,981 | B1 * | 7/2002 | Jacobs | B23Q 11/08 384/15 |
| 2003/0046871 | A1 * | 3/2003 | Walter | B23Q 11/08 49/171 |
| 2003/0129035 | A1 * | 7/2003 | Schworer | B23Q 1/52 409/168 |
| 2004/0035266 | A1 * | 2/2004 | Montesanti | B23B 29/04 82/1.11 |
| 2005/0166726 | A1 * | 8/2005 | Montesanti | B23B 5/00 82/1.11 |
| 2008/0018287 | A1 | 1/2008 | Ogawa | |

FOREIGN PATENT DOCUMENTS

| | | | |
|---|---|---|---|
| JP | 8-112 | Y2 | 1/1996 |
| JP | 3019068 | B2 | 3/2000 |
| JP | 2000-225561 | A | 8/2000 |
| JP | 2006-43883 | A | 2/2006 |
| JP | 2006043883 | A * | 2/2006 |
| JP | 2008-15740 | A | 1/2008 |
| JP | 2008-272853 | A | 11/2008 |
| JP | 2008272853 | A * | 11/2008 |
| JP | 2011-104725 | A | 6/2011 |
| JP | 2013-188800 | A | 9/2013 |
| JP | 2013-226616 | A | 11/2013 |
| JP | 5374235 | B2 | 12/2013 |

OTHER PUBLICATIONS

Office Action dated Jul. 21, 2015, corresponding to Japanese patent application No. 2014-125783.

Office Action dated Oct. 6, 2015, corresponding to Japanese Patent Application No. 2014-125783.

* cited by examiner

ROTARY TABLE ASSEMBLY WITH COVER

RELATED APPLICATIONS

The present application claims priority to Japanese Application Number 2014-125783, filed Jun. 18, 2014, the disclosure of which is hereby incorporated by reference herein in its entirety.

BACKGROUND OF THE INVENTION

Field of the Invention

The present invention relates to a rotary table assembly to be set on a machine tool.

Description of the Related Art

In a machine tool such as a machining center, a workpiece to be machined is set on a rotary table and is sometimes subjected to various types of machining such as milling and tapping by means of a tool attached to a spindle. The machine tool comprises a spindle head, vertical movement device, horizontal movement device, and spindle drive device. The spindle head rotatably supports the spindle fitted with the tool. The vertical movement device vertically reciprocates the spindle head, while the horizontal movement device horizontally moves the spindle head. The spindle drive device rotates the spindle. The rotary table that supports the workpiece is enabled to perform more complicated machining by being rotated in accordance with the movement of the spindle.

The machine tool constructed in this manner generally uses a cutting fluid to achieve smooth machining. Further, chips are produced as the workpiece is machined. If the cutting fluid used in the machining or the chips produced during the machining get into the machine tool, the operation of the machine tool may be hindered thereby. As shown in FIG. 8, therefore, a sliding portion of the machine tool is provided with a seal member such that the cutting fluid and chips can be prevented from getting into the machine tool. In FIG. 8, reference numerals 1, 2a and 11 denote a case, shaft, and oil seal, respectively.

Japanese Patent Application Laid-Open No. 2011-104725 discloses a technique in which an air seal ring is disposed between a body and a table rotator of a rotary table, thereby preventing intrusion of foreign matter between the body and the table rotator.

Japanese Patent Application Laid-Open No. 2013-188800 discloses a technique in which a rotating base of a rotating device is grooved to form a labyrinth seal, in order to suppress intrusion of foreign matter into a housing that supports a rotating shaft for rotation.

Japanese Examined Utility Model Application Publication No. 8-112 (JP 8-112, Y2) discloses a technique in which a seal member is disposed between a rotary table bearing and a gap portion of an index table used in a machine tool.

In any of the techniques disclosed in the above three patent documents, intrusion of foreign matter is suppressed by forming a seal structure such as a labyrinth seal between a workpiece mounting table and a fixed portion that constitutes a rotary table. If chips produced during machining are very fine, however, they may adhere to the seal member. If the sliding portion is slid in this state, the seal member may be worn away so that its sealing performance is reduced. Thus, there is a possibility of the cutting fluid and chips getting into the machine tool.

In order to prevent the seal member at the sliding portion from being worn away, therefore, it is essential to protect the seal member. Possibly, moreover, the chips may also adhere to some other portions of the main body of the rotary table than the sliding portion. In this case, removal of the chips during maintenance work is time-consuming, and in addition, the chips may get into the machine tool to cause a further problem when a mechanism section of the machine tool is disassembled during the maintenance work.

SUMMARY OF THE INVENTION

Accordingly, in order to solve the above-described problems, the present invention has an object to provide a rotary table assembly configured to prevent chips from adhering to a rotary table and a seal member at a sliding portion.

A rotary table assembly according to the present invention comprises a rotating shaft, a rotary table with a workpiece mounting table on one end of the rotating shaft, and a cover covering the rotary table. A seal member is disposed between the cover and the workpiece mounting table.

The seal member may be a labyrinth seal.

A plate member may be disposed on that part of the rotary table which is located outside or inside the seal member.

The cover may be provided with an air inlet port connectable with an air source such that air is allowed to flow out through the seal member as the air flows from the outside of the cover to the inside through the air inlet port.

According to the present invention, there can be provided a rotary table assembly configured to prevent chips from adhering to a rotary table and a seal member at a sliding portion.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
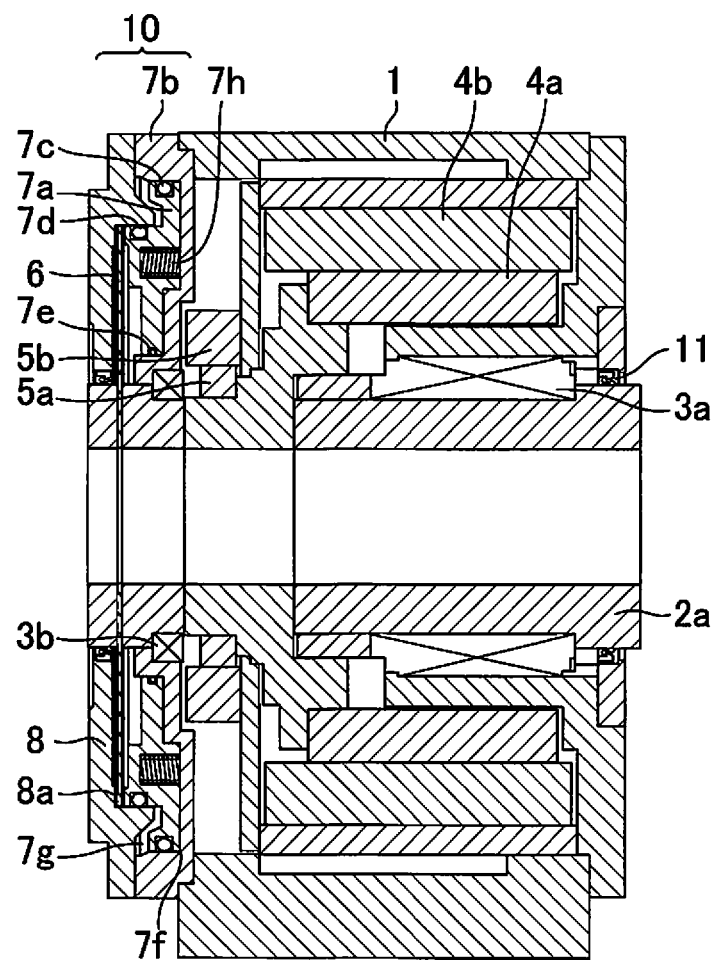
FIG. 1 is a detailed sectional view showing the basic structure of a rotary table.

The basic structure of a rotary table will first be described with reference to FIG. 1.

A main bearing 3a and a support bearing 3b are disposed in a case 1. A shaft 2a of the rotary table is rotatably supported by the main bearing 3a and the support bearing 3b.

A stator 4b of a motor, cylinder 7b of a brake, sensor head 5b, and lid 8 are secured to the case 1. A rotor 4a of the motor, sensor gear 5a, and disk 6 are all secured to the shaft 2a so as to be rotatable integrally with the rotary table.

Further, an oil seal 11 is secured to the case 1 and can prevent external intrusion of foreign matter by contacting the shaft 2a.

A piston 7a is set in the cylinder 7b so that it can advance and retreat with the aid of seal members 7c, 7d and 7e and is urged toward a clamped side by means of a plurality of coil springs 7h. Furthermore, an advancing air chamber 7f and a retreating air chamber 7g are disposed between the piston 7a and the cylinder 7b. The piston 7a can be moved forward or backward (advanced or retreated) by introducing compressed air into the air chambers 7f and 7g.

The piston 7a, cylinder 7b, air chambers 7f and 7g, and disk 6 constitute a clamping device 10.

The shaft 2a can be switched between a clamped state and an unclamped state. In the unclamped state, compressed air is delivered to the retreating air chamber 7g by a solenoid valve (not shown) so that the piston 7a is moved against the compressive force of the coil springs 7h to a retreated end in the cylinder 7b.

In the clamped state, in contrast, the retreating air chamber 7g is exhausted by the solenoid valve and the compressed air is delivered to the advancing air chamber 7f so that the piston 7a advances. Thereupon, the disk 6 is sandwiched and secured between the advanced piston 7a and a friction surface 8a of the lid 8.

A first embodiment of a rotary table assembly according to the present invention will now be described with reference to FIGS. 2 to 4.

Figure 2:
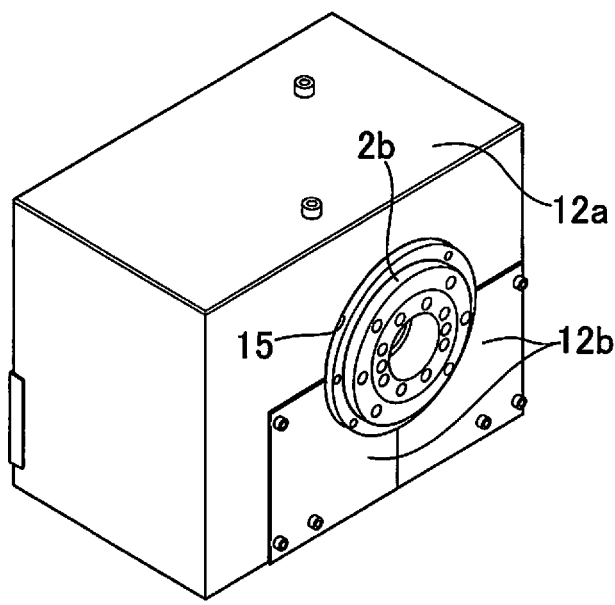
FIG. 2 is a schematic view of a first embodiment of a rotary table assembly according to the present invention.

As shown in FIG. 2, the rotary table assembly of this embodiment comprises the rotary table and first and second covers 12a and 12b that cover the entire rotary table. Only a workpiece mounting table 2b and a labyrinth seal 15 (FIG. 4) that constitute the rotary table are exposed to the outside from the covers 12a and 12b.

Figure 3:
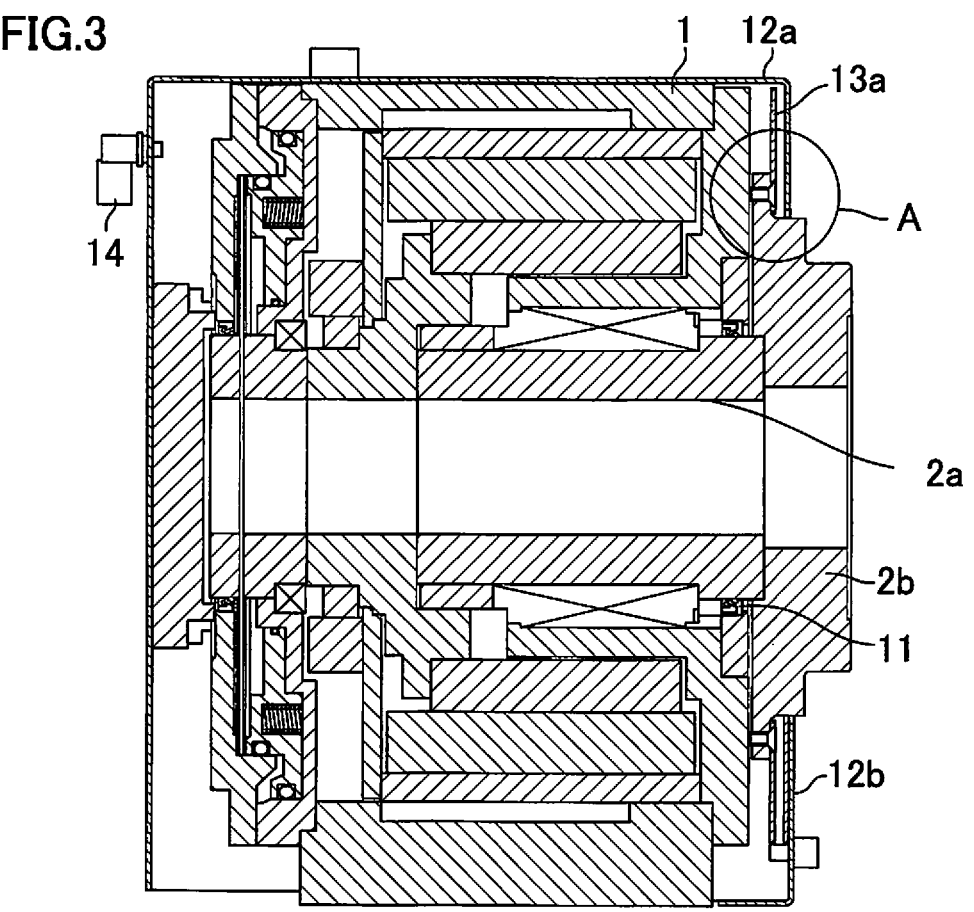
FIG. 3 is a sectional view of the rotary table assembly of FIG. 2.
Figure 4:
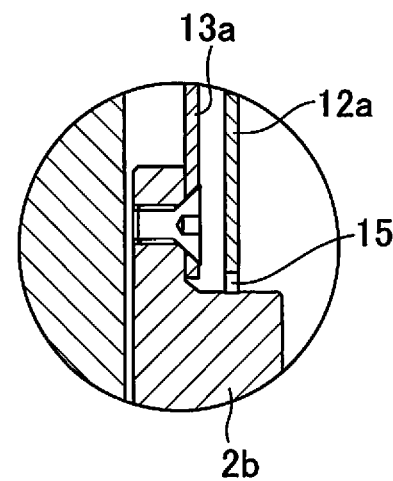
FIG. 4 is an enlarged view of a portion A shown in FIG. 3.

As shown in FIG. 3, a disk-shaped plate 13a is secured to an axially outside part of the workpiece mounting table 2b on the shaft 2a so as to surround the table 2b and can rotate together with the table 2b. Further, the covers 12a and 12b are disposed on the body case 1 so as to surround substantially the entire rotary table. These covers 12a and 12b cover the outer side of the disk-shaped plate 13a (workpiece mounting side of the workpiece mounting table 2b) in such a manner that the labyrinth seal 15 (see FIGS. 2 and 4) is formed between the workpiece mounting table 2b and the covers 12a and 12b. The labyrinth seal 15 serves to prevent intrusion of foreign matter.

The disk-shaped plate 13a disposed on the workpiece mounting table 2b can prevent foreign matter, if any, externally introduced through the labyrinth seal 15 from adhering directly to the oil seal 11.

Further, a joint 14 is attached to the cover 12a on the opposite side of the rotary table relative to the workpiece mounting table 2b. A pipe can be connected to the joint 14 so that air from an air source (not shown) can flow into the rotary table through the pipe. The introduced air flows out of a part of the labyrinth seal 15 between the workpiece mounting table 2b and the covers 12a and 12b. Thus, an outgoing air flow from the rotary table is produced such that the sealability of the labyrinth seal 15 is improved and external intrusion of foreign matter can be further efficiency prevented.

While the labyrinth seal 15 is used as the seal member between the workpiece mounting table 2b and the covers 12a and 12b in the present embodiment, it may be replaced with a seal member of some other type. In the present embodiment, moreover, the workpiece is set on the workpiece mounting table 2b disposed on the shaft 2a. Alternatively, however, the shaft 2a may be configured so that the workpiece can be set directly on it. In this case, a seal member, such as a labyrinth seal, is disposed between the shaft 2a and the covers 12a and 12b. Although the oil seal 11 is provided in the present embodiment, furthermore, intrusion of chips and the like into the rotary table can be prevented by means of a disk-shaped plate and a seal member such as a labyrinth seal without using an oil seal.

A second embodiment of the rotary table assembly according to the present invention will now be described with reference to FIGS. 5 to 7.

Figure 5:
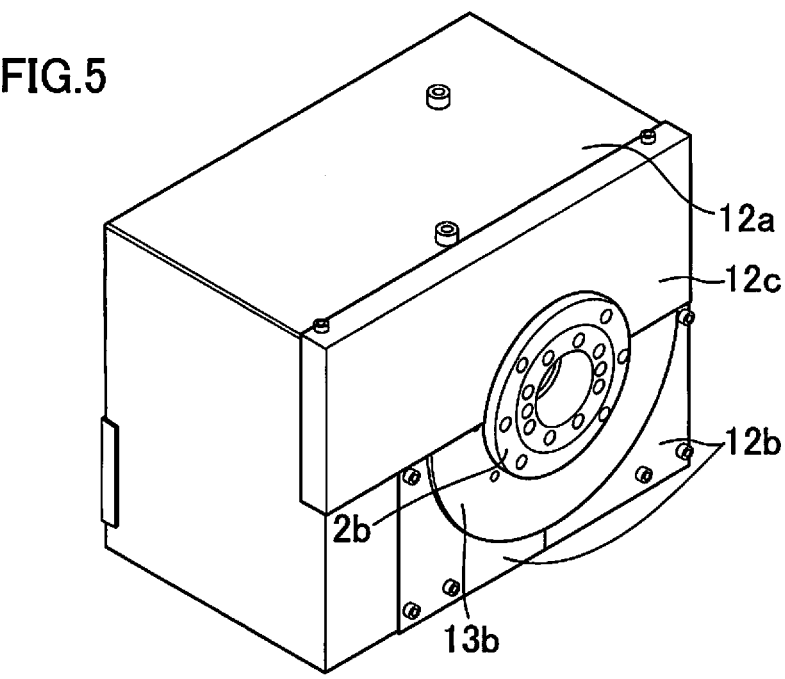
FIG. 5 is a schematic view of a second embodiment of the rotary table assembly according to the present invention.

This embodiment differs from the first embodiment in that an upper cover 12c and a disk-shaped plate 13b are provided outside the rotary table of the first embodiment, as shown in FIG. 5.

Figure 6:
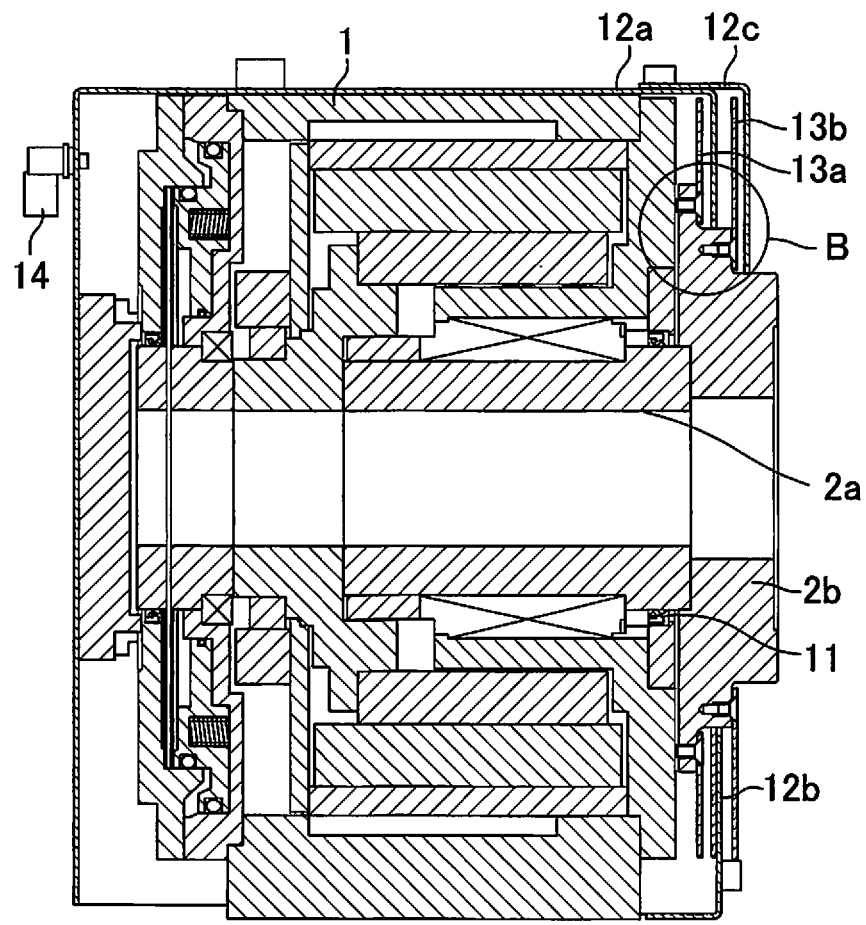
FIG. 6 is a sectional view of the rotary table assembly of FIG. 6.
Figure 7:
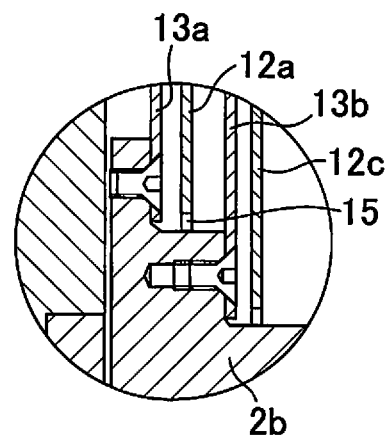
FIG. 7 is an enlarged view of a portion B shown in FIG. 6.

In the rotary table assembly of this embodiment, like that of the first embodiment, a disk-shaped plate 13a is secured to an axially outside part of a workpiece mounting table 2b on a shaft 2a so as to surround the table 2b, as shown in FIG. 6. Further, covers 12a and 12b are disposed on the body case 1 so as to surround substantially the entire rotary table. These covers 12a and 12b (first and second covers) cover the outer side of the disk-shaped plate 13a (first disk-shaped plate). In this second embodiment, moreover, the additional disk-shaped plate 13b (second disk-shaped plate) is disposed outside the disk-shaped plate 13a and the first cover 12a, and the cover 12c (third cover) is further disposed outside the disk-shaped plate 13b.

Figure 7A:
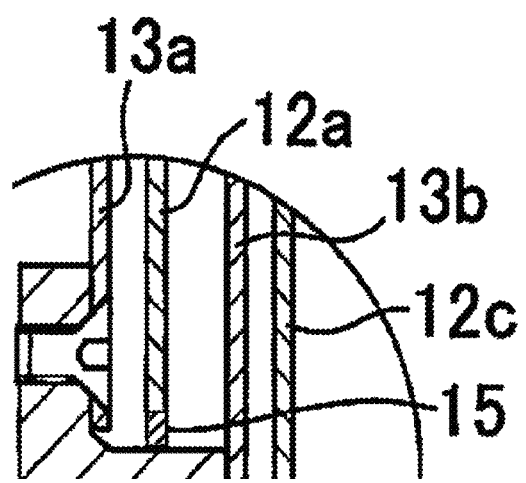
FIG. 7A is an enlarged view of a portion of FIG. 7.
Figure 8:
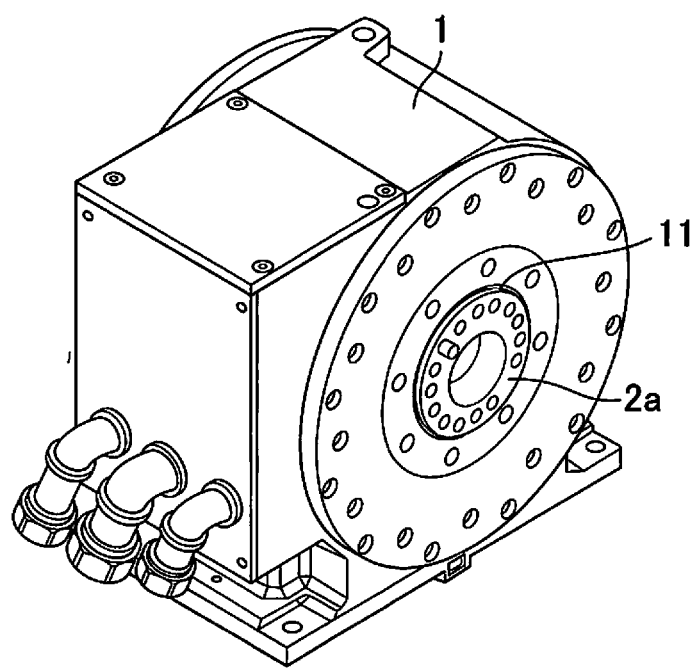
FIG. 8 is a schematic view of a conventional rotary table assembly.

The second disk-shaped plate 13b is secured to the workpiece mounting table 2b and can rotate together with the table 2b. Further, the third cover 12c is secured to the first cover 12a. Thus, in the present embodiment, the covers 12a and 12b and the disk-shaped plates 13a and 13b each have a dual structure, and the first and second disk-shaped plates 13a and 13b are disposed inside and outside a labyrinth seal 15, respectively, as shown in FIG. 7 and in more detail in FIG. 7A. Therefore, most foreign matter is prevented from reaching the labyrinth seal 15 by the third cover 12c and the second disk-shaped plate 13b. Even if a little foreign matter reaches the labyrinth seal 15, its intrusion is prevented by the labyrinth seal 15 and hardly any foreign matter is allowed to get into the assembly. Even if the labyrinth seal 15 is penetrated by the foreign matter, furthermore, the presence of the first disk-shaped plate 13a further reduces the possibility of the foreign matter from reaching an oil seal 11.

As in the first embodiment, moreover, a joint 14 is attached to the first cover 12a, and a pipe can be connected to the joint 14 so that air from an air source (not shown) can flow into the rotary table through the pipe. The introduced air flows out of a part of the labyrinth seal 15 between the workpiece mounting table 2b and the first and second covers 12a and 12b. Thus, an outgoing air flow from the rotary table is produced such that the sealability of the labyrinth seal 15 is improved and external intrusion of foreign matter can be further efficiency prevented.

While the labyrinth seal 15 is used as the seal member between the workpiece mounting table 2b and the first and second covers 12a and 12b in the present embodiment, as in the first embodiment, it may be replaced with a seal member of some other type. In the present embodiment, moreover, the workpiece is set on the workpiece mounting table 2b disposed on the shaft 2a. Alternatively, however, the shaft 2a may be configured so that the workpiece can be set directly on it. In this case, a seal member, such as a labyrinth seal, is disposed between the shaft 2a and the covers 12a and 12b. Although the oil seal 11 is provided in the present embodiment, furthermore, intrusion of chips and the like into the rotary table can be prevented by means of a disk-shaped plate and a seal member such as a labyrinth seal without using an oil seal.

In both the first and second embodiments, the disk-shaped plate and the covers that cover the rotary table are configured to be removable and can be mounted depending on the machining contents.

The invention claimed is:

1. A rotary table assembly, comprising:
   a rotating shaft,
   a rotary table with a workpiece mounting table on one end of the rotating shaft,
   a cover covering the rotary table,
   a first plate member and a second plate member, wherein the first and second plate members are attached to the workpiece mounting table to rotate together with the workpiece mounting table, and
   a seal member disposed between the cover and the workpiece mounting table, wherein the seal member is located between the first and second plate members,
   wherein, in a cross-section view taken along a rotational axis of the rotating shaft, the cover has
      a first cover portion extending toward the workpiece mounting table and located between the first and second plate members, and
      a second cover portion extending toward the workpiece mounting table and located on an outside of the second plate member, the second plate member arranged between the first and second cover portions,
   wherein the seal member is an air seal ring disposed between an inner end of the first cover portion and the workpiece mounting table, and
   wherein the assembly is free of a seal between the cover and the second plate member.

2. The rotary table assembly according to claim 1, wherein
   the first plate member is disposed on a first part of the workpiece mounting table which is located inside the seal member, and
   the second plate member is disposed on a second part of the workpiece mounting table which is located outside the seal member.

3. The rotary table assembly according to claim 1, wherein the first and second plate members are removably attached to the workpiece mounting table.

4. The rotary table assembly according to claim 1, wherein the air seal ring is disposed at a location that is
   between the first and second plate members in an axial direction along the rotational axis of the rotating shaft, and
   between the inner end of the first cover portion and the workpiece mounting table in a radial direction perpendicular to the axial direction.

5. A rotary table assembly, comprising:
   a rotating shaft;
   a cover covering the rotating shaft;
   a seal member disposed between the cover and the shaft, wherein the shaft is configured such that a workpiece is set directly on the shaft; and
   a first plate member and a second plate member,
   wherein the first and second plate members are attached to the shaft to rotate together with the shaft,
   wherein the seal member is located between the first and second plate members,
   wherein, in a cross-section view taken along a rotational axis of the rotating shaft, the cover has
      a first cover portion extending toward the shaft and located between the first and second plate members, and
      a second cover portion extending toward the shaft and located on an outside of the second plate member, the second plate member arranged between the first and second cover portions,
   wherein the seal member is an air seal ring disposed between an inner end of the first cover portion and the shaft, and
   wherein the assembly is free of a seal between the cover and the second plate member.

6. The rotary table assembly according to claim 5, wherein the first plate member is disposed inside the seal member, and the second plate member is disposed outside the seal member.

7. The rotary table assembly according to claim 5, wherein the air seal ring is disposed at a location that is
   between the first and second plate members in an axial direction along the rotational axis of the rotating shaft, and
   between the inner end of the first cover portion and the shaft in a radial direction perpendicular to the axial direction.

* * * * *